US012474042B1

(12) United States Patent
D'Ascanio et al.

(10) Patent No.: US 12,474,042 B1
(45) Date of Patent: Nov. 18, 2025

(54) ELECTRICAL LANDSCAPE FIXTURE WITH MULTI-DIRECTIONAL LED MODULE LIGHTING

(71) Applicants: Franco L D'Ascanio, Key Colony Beach, FL (US); Sean P Snowden, Marathon, FL (US); Harold Zimmermann, Riverton, NJ (US)

(72) Inventors: Franco L D'Ascanio, Key Colony Beach, FL (US); Sean P Snowden, Marathon, FL (US); Harold Zimmermann, Riverton, NJ (US)

(73) Assignee: COASTAL SOURCE, LLC

(*) Notice: Subject to any disclaimer, the term of this patent is extended or adjusted under 35 U.S.C. 154(b) by 0 days.

(21) Appl. No.: 19/232,989

(22) Filed: Jun. 10, 2025

(51) Int. Cl.

| | |
|---|---|
| ***F21V 33/00*** | (2006.01) |
| ***F21V 13/02*** | (2006.01) |
| ***F21V 23/00*** | (2015.01) |
| ***F21V 23/06*** | (2006.01) |
| ***F21V 31/00*** | (2006.01) |
| ***F21W 131/10*** | (2006.01) |
| ***F21Y 115/10*** | (2016.01) |

(52) U.S. Cl.
CPC ............ *F21V 33/006* (2013.01); *F21V 13/02* (2013.01); *F21V 23/001* (2013.01); *F21V 23/06* (2013.01); *F21V 31/005* (2013.01); *F21W 2131/10* (2013.01); *F21Y 2115/10* (2016.08)

(58) Field of Classification Search
CPC ...... F21V 33/006; F21V 13/02; F21V 23/001; F21V 23/06; F21V 31/005; F21W 2131/10; F21Y 2115/10
See application file for complete search history.

(56) References Cited

U.S. PATENT DOCUMENTS

| | | | | |
|---|---|---|---|---|
| 7,320,533 | B1 * | 1/2008 | Beadle | F21V 9/00 362/427 |
| 10,900,622 | B1 * | 1/2021 | D'Ascanio | F21S 8/022 |
| 11,333,333 | B1 * | 5/2022 | Hwang | F21S 9/037 |
| 11,402,079 | B1 * | 8/2022 | Bucher | F21S 8/081 |
| 12,129,987 | B1 * | 10/2024 | D'Ascanio | F21V 14/08 |
| 2008/0247161 | A1 * | 10/2008 | Hulsey | B63B 45/04 362/227 |
| 2014/0369060 | A1 * | 12/2014 | Zhang | F21S 43/26 29/592.1 |

* cited by examiner

*Primary Examiner* — Tsion Tumebo
(74) *Attorney, Agent, or Firm* — Stuart M Goldstein

(57) ABSTRACT

A landscape lighting fixture has elongated wiring and a sealed self-contained waterproof LED module unit. This module unit has an LED lighting element with a plurality of up firing LED lights for providing illumination in a lateral, an upward, and a vertical direction and a plurality of outward firing LED lights for providing illumination horizontal direction. An integrated lens is located over the lighting element and a lens filter is located over the lens. A rubber grommet is provided to allow the LED module unit to be press-fitted into openings, in certain applications.

2 Claims, 5 Drawing Sheets

ELECTRICAL LANDSCAPE FIXTURE WITH MULTI-DIRECTIONAL LED MODULE LIGHTING

FIELD OF THE INVENTION

This invention relates to electrical landscape lighting fixtures, and particularly to a lighting fixture with multi directional LED lights.

BACKGROUND OF THE INVENTION

Outdoor landscape lighting systems are provided to illuminate and enhance the look of exterior natural and creatively designed landscapes. Such systems usually consist of a variety of different lighting fixtures, many of which have varying illuminating effects. One important effect is the use of multi-directional lighting to create different visual formats and path lighting. However, there are very few self-containing fixtures which have the capability.

SUMMARY OF THE INVENTION

It is thus the object of the present invention to provide a landscape lighting fixture which comprises a sealed, self-contained waterproof LED module unit having a plurality of LED lights which provide illumination in different directions.

This and other objects are accomplished by the present invention, a landscape lighting fixture having an elongated riser and a sealed self-contained waterproof LED module unit. This module unit has an LED lighting element with a plurality of up firing LED lights for providing illumination in a lateral, an upward, and a vertical direction and a plurality of outward firing LED lights for providing illumination in the horizontal direction. An integrated lens is located over the lighting element and a lens filter is located over the lens. A rubber grommet provides a means to "press-fit" the LED waterproof module unit into an opening, in certain applications.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
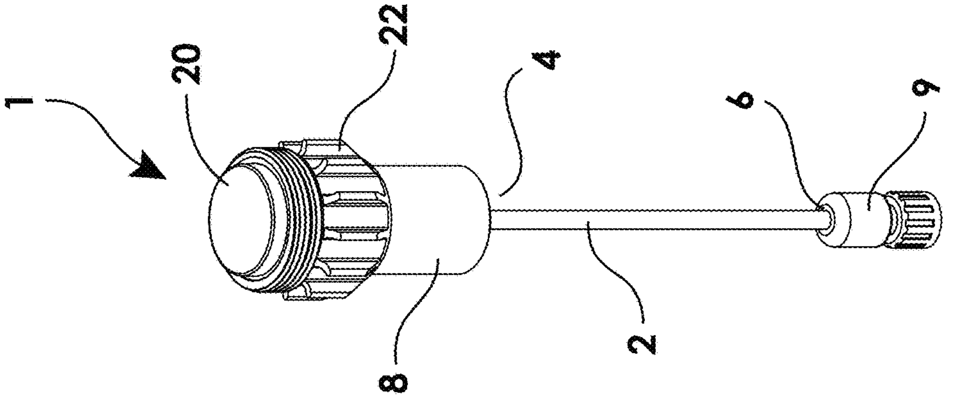
FIG. 1 is a top perspective view of the landscape lighting fixture of the present invention.
Figure 2:
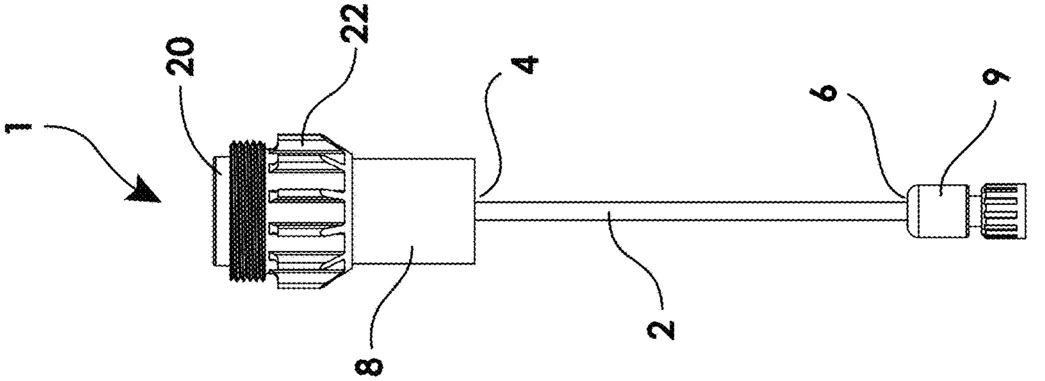
FIG. 2 is an elevation view of the landscape lighting fixture of the present invention.
Figure 3:
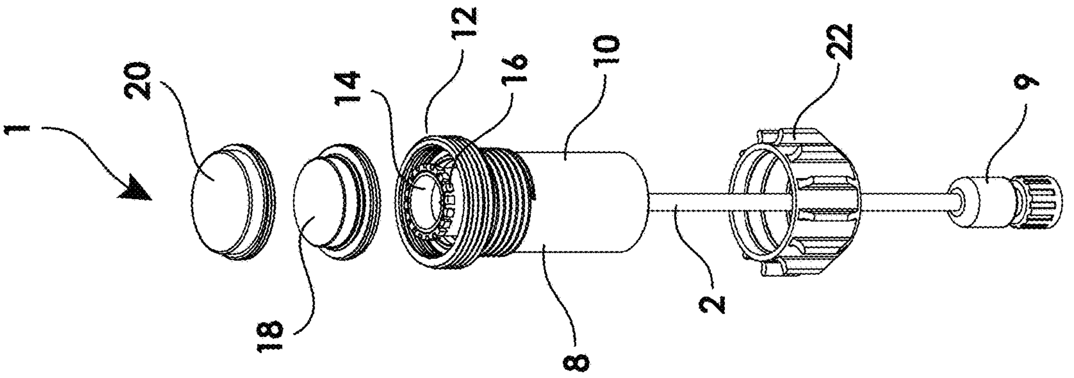
FIG. 3 is an exploded view of the components of the landscape lighting fixture of the present invention.
Figure 6:
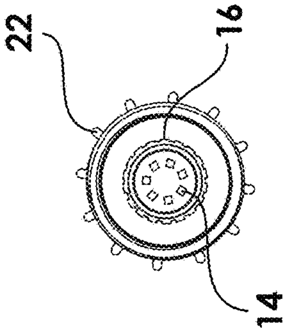
FIG. 6 is a top view of the landscape lighting fixture of the present invention with its lens filter and integrated lens removed.
Figure 5:
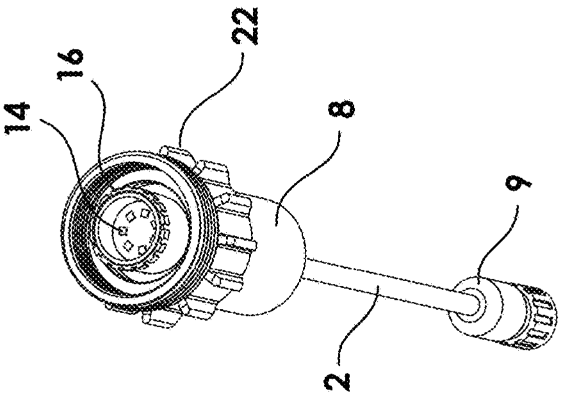
FIG. 5 is a top perspective view of the landscape lighting fixture of the present invention with its lens filter and integrated lens removed.
Figure 4:
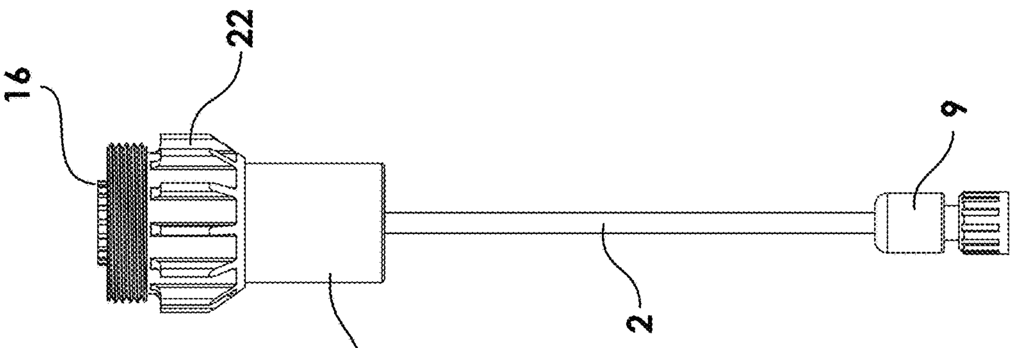
FIG. 4 is an elevation view of the landscape lighting fixture of the present invention with its lens filter and integrated lens removed.
Figure 7:
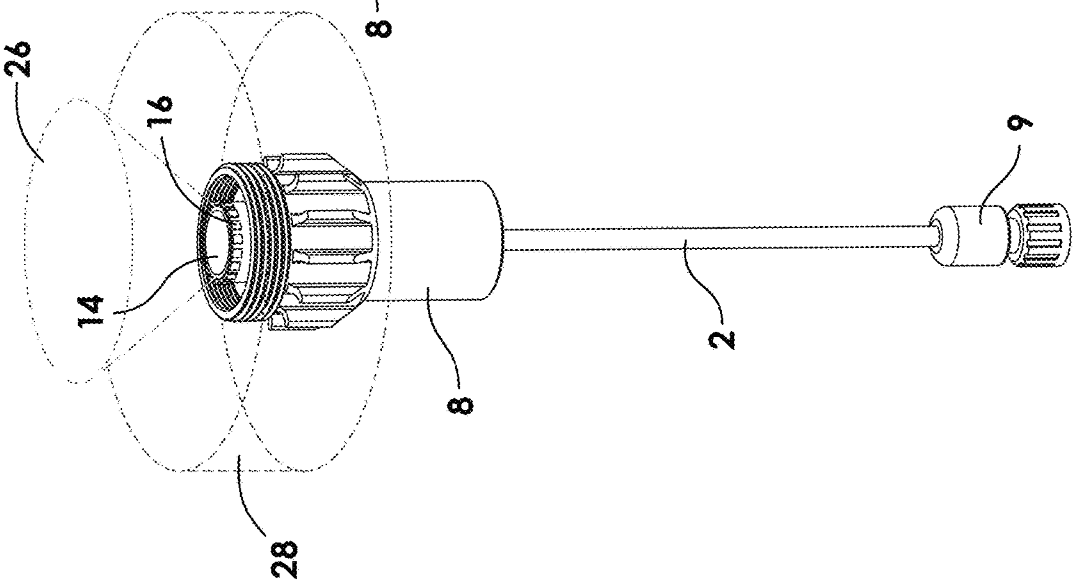
FIG. 7 is a view of the landscape lighting fixture of the present invention illustrating illumination dispersion patterns which emanate from the fixture.

Landscape lighting fixture 1 comprises elongated wiring 2 having upper end 4 and lower end 6. LED module unit 8 is electrically connected to upper end 4 of wiring 2. Electrical connector 9, which receives electricity from an electrical power source, is connected at lower end 6 to wiring 2.

Module unit 8 comprises modular body 10 having LED lighting element 12 which itself has a plurality of up firing LED lights 14 for providing illumination in an upward direction in relation to fixture 1 and a plurality of outward firing LED lights 16 for providing illumination laterally in relation to fixture 1.

Module unit 8 also comprises integrated lens 18 located over LED lighting element 12. Lens filter 20 is located over integrated lens 18. Rubber or other flexible material grommet 22 is provided as an accessory which circumscribes module unit 8. The grommet allows the module unit to be ensconced as a "press-fit" into a hole which may be drilled by the module unit installer.

Figure 9:
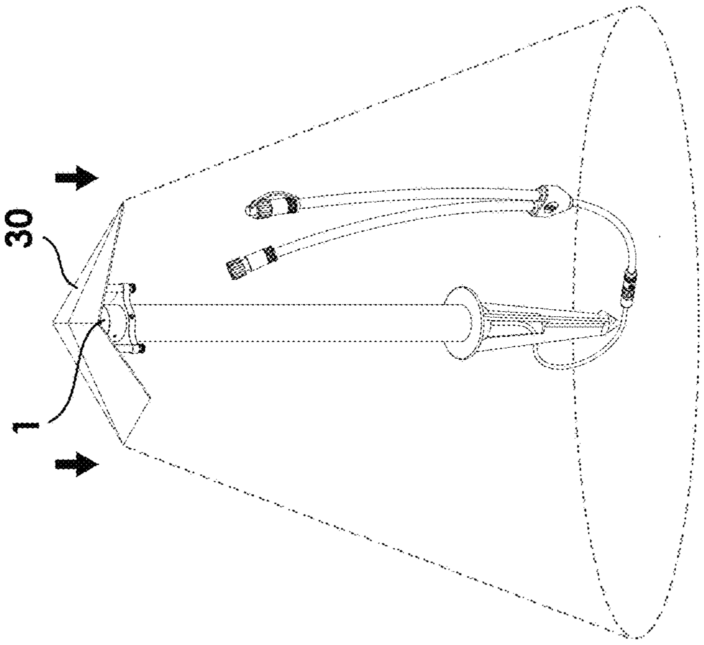
FIGS. 8 and 9 illustrate the use of the landscape lighting fixture of the present invention used in combination with adjustable directional beam angle path systems.
Figure 8:
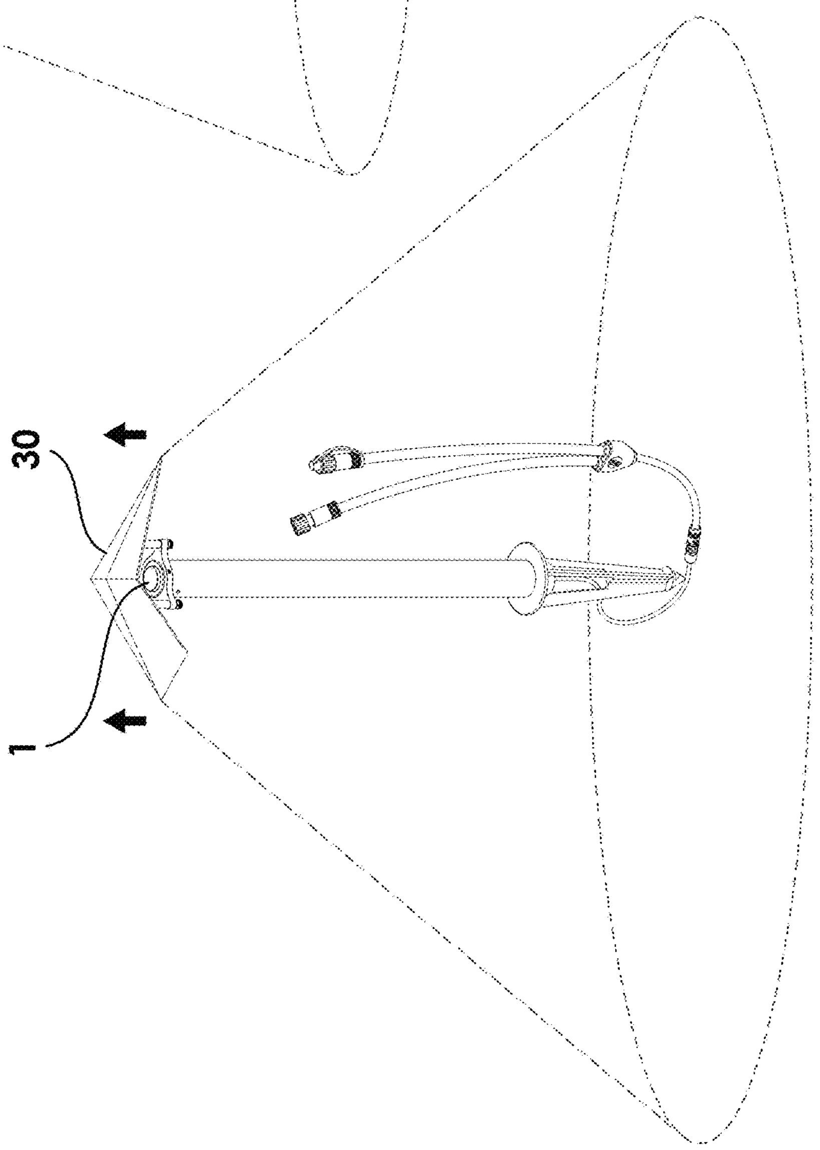

The unique LED landscape lighting fixture 1 of the present invention advantageously provides lateral, horizontal light applications 28 emanating from the outward firing LED lights 16 and upward, vertical light applications 26 emanating from up firing LED lights 14. This combination of up firing and outward firing LED arrays results in superior path lighting applications which enable extremely wide dispersion patterns, especially when used with adjustable beam directional angle path systems. Examples of such systems are illustrated in FIGS. 8-9. Adjustment of path hat 30 over lighting fixture 1 can provide a variety of light beam dispersion angles.

Integrated lens 18 enables LED module unit 8 to be inherently waterproof without the need of any additional shrouds or seals. This is extremely beneficial as some lighting installers may not tighten shrouds or seals completely. This leads to water ingress and failure of the fixture over time.

Significantly, LED module unit 8 is completely self-contained and does not require any additional components for installation or for its protection. It can be paired with a wide number of shrouds and accessories for a seemingly unlimited number of applications.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An LED landscape lighting fixture comprising:
- elongated wiring having an upper end and a lower end;
- an LED modular unit electrically connected to the upper end of the wiring, said LED module unit comprising:
  - a modular body having an attached LED lighting element comprising:
    - a circular upper shroud section circumscribing an open space, a cylindrically shaped inner LED light supporting member located within the space, said inner supporting member comprising a recessed cavity in which are located a plurality of upfiring LED lights for providing illumination in an upward direction in relation to the fixture, a curvilinear shaped array of LED lights circumscribing the inner supporting member and extending above the shroud section for providing illumination laterally in relation to the fixture;

an integrated lens located over the LED lighting element; and a lens filter located over the integrated lens; said LED modular unit forming a sealed, self contained waterproof modular unit; and an electrical connector located at the lower end of the wiring for receiving electricity to illuminate the plurality of LED lights in the LED lighting element.

2. The landscape fixture as in claim 1 further comprising a grommet which circumscribes the LED module unit.

* * * * *